US009512568B2

(12) United States Patent
Brotherson et al.

(10) Patent No.: US 9,512,568 B2
(45) Date of Patent: Dec. 6, 2016

(54) METHODS FOR INCREASING RETENTION AND DRAINAGE IN PAPERMAKING PROCESSES

(71) Applicant: Ecolab USA Inc., Naperville, IL (US)

(72) Inventors: Brett Brotherson, Lisle, IL (US); Peter E. Reed, Plainfield, IL (US); Xiaojin Harry Li, Palatine, IL (US); William J. Andrews, Parker, CO (US); Mingli Wei, Naperville, IL (US)

(73) Assignee: ECOLAB USA INC., Naperville, IL (US)

( * ) Notice: Subject to any disclaimer, the term of this patent is extended or adjusted under 35 U.S.C. 154(b) by 0 days.

(21) Appl. No.: 14/734,609

(22) Filed: Jun. 9, 2015

(65) Prior Publication Data

US 2015/0267350 A1 Sep. 24, 2015

Related U.S. Application Data

(63) Continuation of application No. 14/202,028, filed on Mar. 10, 2014, now abandoned.

(60) Provisional application No. 61/784,956, filed on Mar. 14, 2013.

(51) Int. Cl.
| | |
|---|---|
| *C08F 20/56* | (2006.01) |
| *D21H 21/10* | (2006.01) |
| *C08F 8/48* | (2006.01) |
| *D21H 17/37* | (2006.01) |
| *D21H 17/45* | (2006.01) |
| *D21H 17/40* | (2006.01) |

(52) U.S. Cl.
CPC ............... *D21H 21/10* (2013.01); *C08F 8/48* (2013.01); *C08F 20/56* (2013.01); *D21H 17/375* (2013.01); *D21H 17/40* (2013.01); *D21H 17/45* (2013.01); *C08F 2810/10* (2013.01)

(58) Field of Classification Search
None
See application file for complete search history.

(56) References Cited

U.S. PATENT DOCUMENTS

| | | | | |
|---|---|---|---|---|
| 3,247,171 | A | * | 4/1966 | Walker ............... B01J 19/06 525/329.4 |
| 3,953,342 | A | | 4/1976 | Martin et al. |
| 4,728,696 | A | | 3/1988 | Van Phung et al. |
| 4,872,071 | A | | 10/1989 | Easton et al. |
| 4,954,538 | A | | 9/1990 | Dauplaise et al. |
| 5,130,479 | A | * | 7/1992 | Ulbrich ............... A61K 9/2027 562/874 |
| 5,840,804 | A | * | 11/1998 | Carl ................... B01D 21/01 524/458 |
| 5,883,210 | A | * | 3/1999 | Ahmed ............... C07C 237/04 526/263 |
| 6,235,150 | B1 | | 5/2001 | Middleton et al. |
| 6,454,003 | B1 | | 9/2002 | Chang et al. |
| 6,592,718 | B1 | * | 7/2003 | Wong Shing .......... C08L 33/24 162/158 |
| 6,729,402 | B2 | | 5/2004 | Chang et al. |
| 6,984,705 | B2 | | 1/2006 | Chang et al. |
| 7,250,448 | B2 | | 7/2007 | Walchuk et al. |
| 7,300,973 | B2 | | 11/2007 | Chang et al. |
| 7,700,702 | B2 | | 4/2010 | Gaillard et al. |
| 7,833,944 | B2 | | 11/2010 | Munoz et al. |
| 7,888,296 | B2 | | 2/2011 | Morris et al. |
| 7,897,546 | B2 | | 3/2011 | Showalter et al. |
| 7,902,127 | B2 | | 3/2011 | Kurian et al. |
| 7,928,042 | B2 | | 4/2011 | Reed et al. |
| 7,947,630 | B2 | | 5/2011 | Atkins et al. |
| 7,989,401 | B2 | | 8/2011 | Kurian et al. |
| 8,152,962 | B2 | | 4/2012 | Koch et al. |
| 8,613,832 | B2 | | 12/2013 | Nyander et al. |
| 8,871,692 | B2 | | 10/2014 | Favero et al. |
| 2003/0150575 | A1 | | 8/2003 | Hund et al. |
| 2003/0168192 | A1 | | 9/2003 | Mohammed |
| 2004/0040683 | A1 | | 3/2004 | Hund et al. |
| 2005/0150622 | A1 | | 7/2005 | Hund et al. |
| 2005/0161182 | A1 | | 7/2005 | Capwell |
| 2005/0272889 | A1 | | 12/2005 | Kiyosada et al. |
| 2006/0142476 | A1 | | 6/2006 | Weerawarna |
| 2006/0243407 | A1 | | 11/2006 | Hund et al. |
| 2007/0277981 | A1 | | 12/2007 | Robb et al. |
| 2009/0283232 | A1 | | 11/2009 | Hund et al. |
| 2011/0024128 | A1 | | 2/2011 | Kaminsky |
| 2011/0155339 | A1 | | 6/2011 | Brungardt et al. |
| 2011/0247775 | A1 | | 10/2011 | Sutman et al. |
| 2012/0058922 | A1 | | 3/2012 | Favero et al. |
| 2012/0264888 | A1 | | 10/2012 | Gu et al. |
| 2013/0005616 | A1 | | 1/2013 | Gaillard et al. |
| 2014/0174683 | A1 | | 6/2014 | Nyander et al. |
| 2014/0209304 | A1 | | 7/2014 | Reed et al. |
| 2014/0262090 | A1 | | 9/2014 | Brotherson et al. |
| 2014/0309368 | A1 | | 10/2014 | Blondel et al. |

FOREIGN PATENT DOCUMENTS

| | | |
|---|---|---|
| CN | 101148582 A | 3/2008 |
| EP | 0539289 B2 | 1/1996 |
| EP | 1069140 A1 | 1/2001 |
| JP | 2011226042 A | 11/2011 |
| WO | WO 2009/015255 A2 | 1/2009 |
| WO | WO 2010/133258 A1 | 11/2010 |

OTHER PUBLICATIONS

KIPO, International Search Report in International Patent Application No. PCT/US2014/011552, May 23, 2014, 4 pp.

(Continued)

*Primary Examiner* — Robert C Boyle
(74) *Attorney, Agent, or Firm* — Leydig, Voit & Mayer, Ltd.

(57) ABSTRACT

Disclosed herein are methods of increasing retention and drainage in papermaking processes using high molecular-weight, water-soluble polymers.

22 Claims, 4 Drawing Sheets

(56) References Cited

OTHER PUBLICATIONS

KIPO, Written Opinion in International Patent Application No. PCT/US2014/011552, May 23, 2014, 12 pp.

Kot et al., "Novel Drag-Reducing Agents for Fracturing Treatments Based on Polyacrylamide Containing Weak Labile Links in the Polymer Backbone," SPE International, Presented at the SPE International Symposium on Oilfield Chemistry in the Woodlands, Texas, on Apr. 11-13, 2011, SPE 141257, pp. 1-11.

Tillet et al., "Chemical reactions of polymer crosslinking and post-crosslinking at room and medium temperature," *Progress in Polymer Science*, 36, 2011, pp. 191-217.

KIPO, International Search Report in International Patent Application No. PCT/US2014022627, 4 pp. (Jul. 7, 2014).

KIPO, Written Opinion in International Patent Application No. PCT/US2014022627, 6 pp. (Jul. 4, 2014).

* cited by examiner

METHODS FOR INCREASING RETENTION AND DRAINAGE IN PAPERMAKING PROCESSES

The present application is a continuation of U.S. patent application Ser. No. 14/202,028, filed Mar. 10, 2014, the disclosure of which is incorporated herein by reference in its entirety.

TECHNICAL FIELD

The present invention relates to methods for increasing retention and drainage in papermaking processes, using high molecular-weight, water-soluble polymers. Prior to introduction into the papermaking process, the polymers are temporarily cross-linked via hydrolyzable cross-linkers. The cross-linkers can be hydrolyzed prior to addition to the papermaking process, providing a more viscous, high molecular weight, water soluble polymer solution which may act as an effective retention, drainage and formation (RDF) aid.

BACKGROUND

In the manufacture of paper, a papermaking furnish is formed into a paper sheet. The papermaking furnish is an aqueous slurry of cellulosic fiber having a fiber content of about 4 weight percent (percent dry weight of solids in the furnish) or less, and generally around 1.5% or less, and often below 1.0% ahead of the paper machine, while the finished sheet typically has less than 6 weight percent water. Hence the dewatering and retention aspects of papermaking are extremely important to the efficiency and cost of the manufacture.

Gravity dewatering is a preferred method of drainage because of its relatively low cost. Other methods can also used for dewatering, for instance vacuum dewatering, pressing, felt blanket blotting and pressing, evaporation and the like. In actual practice a combination of such methods is employed to dewater, or dry, the sheet to the desired water content. An improvement in the efficiency of drainage processes may decrease the amount of water required to be removed by other methods and hence improve the overall efficiency of dewatering and reduce the cost thereof.

Another aspect of papermaking that is extremely important to the efficiency and cost is retention of furnish components on and within the fiber mat. The papermaking furnish represents a system containing significant amounts of small particles stabilized by colloidal forces. The papermaking furnish generally contains, in addition to cellulosic fibers, particles ranging in size from about 5 to about 1000 nm consisting of, for example, cellulosic fines, mineral fillers (employed to increase opacity, brightness and other paper characteristics) and other small particles that generally, without the inclusion of one or more retention aids, would in significant portion pass through the spaces (pores) between the mat formed by the cellulosic fibers on the paper machine.

Greater retention of fines, fillers, and other components of the furnish permits, for a given grade of paper, a reduction in the cellulosic fiber content of such paper. As pulps of lower quality are employed to reduce papermaking costs, the retention aspect of papermaking becomes more important because the fines content of such lower quality pulps is generally greater. Greater retention also decreases the amount of such substances lost to the whitewater and hence reduces the amount of material costs, the impact of increasing levels of such substances with respect to deposition and contamination, the cost of waste disposal and the adverse environmental effects therefrom. It is generally desirable to reduce the amount of material employed in a papermaking process for a given purpose, without diminishing the result sought. Such add-on reductions may realize both a material cost savings and handling and processing benefits.

Another important characteristic of a given papermaking process is the formation of the paper sheet produced. Formation may be determined by the variance in light transmission within a paper sheet, and a high variance is indicative of poor formation. As retention increases to a high level, for instance a retention level of 80 or 90%, the formation parameter generally declines.

Various chemical additives have been utilized in an attempt to increase the rate at which water drains from the formed sheet, and to increase the amount of fines and filler retained on the sheet. For example, high molecular weight polymers can act as flocculants, forming large flocs which deposit on the sheet. They may also aid in the dewatering of the sheet. In conventional programs, the high molecular weight component is added after a high shear point in the stock flow system leading up to the headbox of the paper machine. This is optimal as flocs are formed primarily by a bridging mechanism and their breakdown is a largely irreversible process. For this reason, most of the retention and drainage performance of a flocculant is lost by feeding it before a high shear point. However, feeding high molecular weight polymers after the high shear point often leads to formation problems. The feed requirements of the high molecular weight polymers and copolymers which provide improved retention often lead to a compromise between retention and formation.

There is therefore continuing need to develop new retention aids to increase the efficiency of pulp or paper manufacture.

SUMMARY

The present invention is generally directed to methods of using water-soluble, high molecular weight polymers for increasing retention and drainage in a papermaking furnish.

In one aspect, the present invention is directed to a method for improving retention and drainage in a papermaking process, comprising:

providing a first composition comprising a water-soluble polymer having hydrolyzable cross-linked monomer units, the polymer comprising about 1 mol % to about 100 mol % acrylamide monomers;

activating the composition to hydrolyze the cross-linked monomer units to provide an activated polymer composition, wherein the activated polymer composition has a viscosity that is greater than the aqueous composition; and adding the activated polymer composition to the papermaking process.

In some embodiments, the hydrolyzable cross-linked monomer units are ionically cross-linked via an ionic interaction between two monomer units. In some embodiments, the water-soluble polymer comprises from about 1 mol % to about 25 mol % ionically cross-linked monomer units.

In some embodiments, the water-soluble polymer comprises at least one monomer unit having the following formula (I):

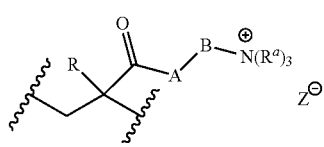

wherein:

R is selected from the group consisting of —H, $C_1$-$C_{24}$ alkyl, $C_2$-$C_{24}$ alkenyl and $C_2$-$C_{24}$ alkynyl;

each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;

A is selected from the group consisting of O, S and $NR^b$;

$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;

$Z^\ominus$ is an anion; and each ∼∼∼ represents a point of attachment to the polymer backbone.

In some embodiments, the monomer unit of formula (I) is derived from a monomer selected from the group consisting of N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, and N,N-dimethylaminopropyl methacrylamide methyl chloride quaternary salt. In some embodiments, the water-soluble polymer further comprises at least one anionic monomer unit derived from a monomer selected from the group consisting of an acrylic acid salt, a methacrylic acid salt, a 2-acrylamido-2-methylpropane sulfonic acid salt and a styrene sulfonic acid salt. In some embodiments, the hydrolyzable cross-linked monomer units are covalently cross-linked.

In some embodiments, the covalently cross-linked monomer units have the following formula (II):

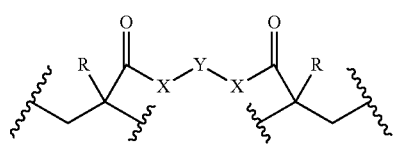

wherein:

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

Y is selected from a group consisting of a bond and a linker comprising 1 to about 1000 member atoms; and each ∼∼∼ represents a point of attachment to a first polymer backbone, and each ∼∧∧∼ represents a point of attachment to the first polymer backbone or to a second polymer backbone.

In some embodiments, the covalently cross-linked monomer units have the following formula (IIa):

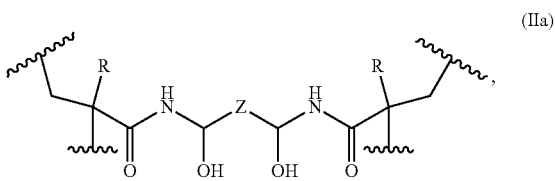

wherein:

each R is independently selected from the group consisting of —H and —$CH_3$;

Z is selected from the group consisting of a bond and a $C_1$-$C_{12}$ alkylenyl group; and each ∼∼∼ represents a point of attachment to a first polymer backbone, and each ∼∧∧∼ represents a point of attachment to the first polymer backbone or to a second polymer backbone.

In some embodiments, the covalently cross-linked monomer units have the following formula (IIb):

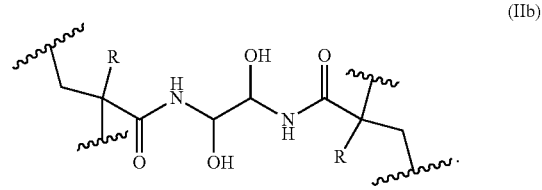

In some embodiments, the water-soluble polymer comprises about 0.1 ppm to about 20000 ppm covalently cross-linked monomer units. In some embodiments, the water-soluble polymer comprises about 0.1 ppm to about 100 ppm covalently cross-linked monomer units. In some embodiments, the aqueous composition comprises about 100 ppm to about 10000 ppm of the water-soluble polymer. In some embodiments, the aqueous composition further comprises an additional retention aid, a filler, an optical brightening agent, a dye, a sizing agent, cationic starch, a fixative, a detackifier, a dispersant, a wet or dry strength additive, or any combination thereof.

In some embodiments, prior to activation, the first composition has a viscosity of about 0 cPs to about 100 cPs. In some embodiments, after activation, the activated polymer composition has a viscosity of about 1 cPs to about 5000 cPs. In some embodiments, the activating step comprises heating the first composition, increasing the ionic strength of the first composition, or increasing the pH of the first composition. In some embodiments, the method comprises adding the activated polymer composition to a wet end of a papermaking machine. In some embodiments, the method comprises adding the activated polymer composition to a pulp slurry.

Other aspects and embodiments of the invention will become apparent in light of the following description and drawings.

DETAILED DESCRIPTION

Figure 1:
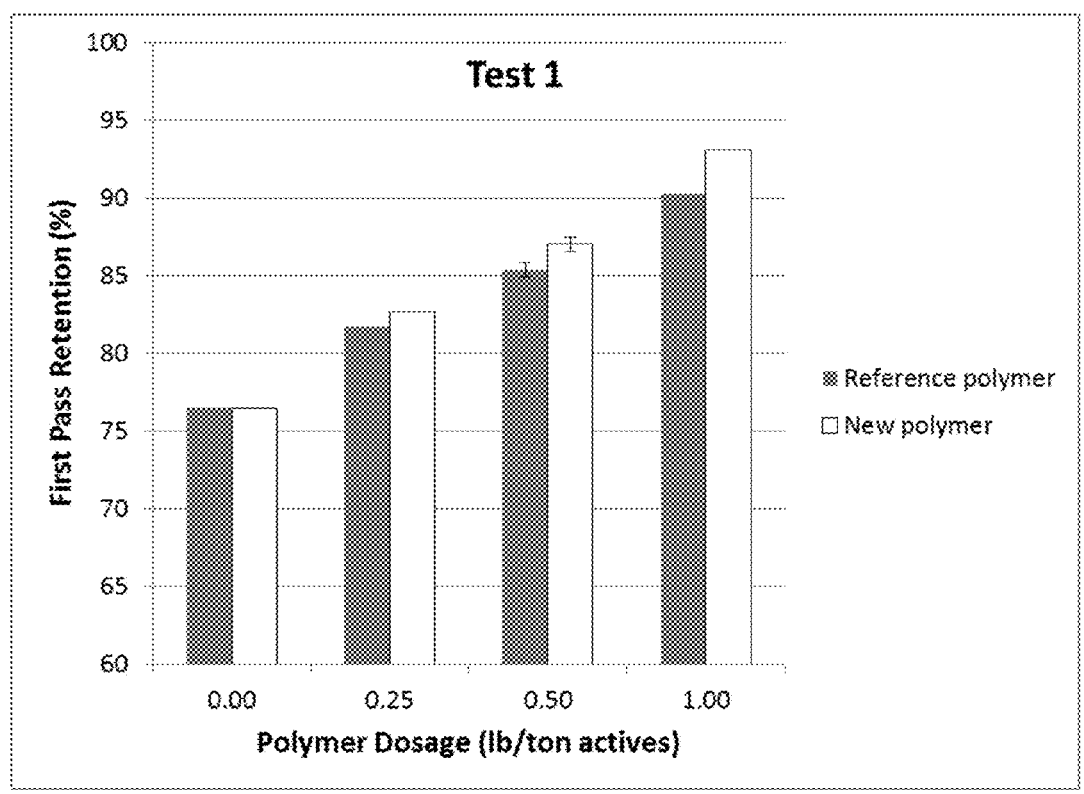
FIG. 1 is a graph of the results of a first pass retention test for various dosages of water-soluble polymers. Error bars represent the 90% confidence intervals.

The present invention is directed to methods of using water-soluble, high molecular weight polymers in papermaking processes, specifically as retention, drainage and/or formation (RDF) aids. The polymers comprise hydrolyzable cross-linked monomers, which can be activated to facilitate hydrolysis of the cross-linkers. The hydrolysis leads to an increase in viscosity of the composition, due to the increase in the hydrodynamic volume of the high molecular weight polymers that are uncrosslinked. The viscosity of the resulting composition is higher than that of a composition comprising a near-identical polymer that lacks the hydrolyzable cross-links. The high molecular weight and the significant hydrodynamic volume of the polymers in the activated polymer composition leads to their effective use as flocculants in papermaking processes.

The high molecular weights achievable with the water-soluble polymers described herein allows for their very effective use in RDF applications. Furthermore, the ability to regulate the viscosity of the compositions allows for the introduction and delivery systems to be used that would not be possible with current polymers used in these applications, without reduced performance.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise.

The present disclosure also contemplates other embodiments "comprising," "consisting of" and "consisting essentially of," the embodiments or elements presented herein, whether explicitly set forth or not.

The term "alkyl," as used herein, refers to a linear or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons. Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined below.

The term "alkylenyl" or "alkylene," as used herein, refers to a divalent group derived from a saturated, straight or branched hydrocarbon chain of from 1 to 50 carbon atoms. The term "$C_1$-$C_6$ alkylene" means those alkylene or alkylenyl groups having from 1 to 6 carbon atoms. Representative examples of alkylenyl groups include, but are not limited to, —$CH_2$—, —$CH(CH_3)$—, —$CH(C_2H_5)$—, —$CH(CH(CH_3)(C_2H_5))$—, —$C(H)(CH_3)CH_2CH_2$—, —$C(CH_3)_2$—, —$CH_2CH_2$—, —$CH_2CH_2CH_2$—, —$CH_2CH_2CH_2CH_2$—, and —$CH_2CH(CH_3)CH_2$—. Alkylenyl groups may be unsubstituted or substituted by one or more suitable substituents, as defined below.

The term "alkenyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl(allyl), iso-propenyl, 2-methyl-1-propenyl, 1-butenyl, and 2-butenyl. Alkenyl groups may be unsubstituted or substituted by one or more suitable substituents, as defined below.

The term "alkenylenyl" or "alkenylene," as used herein, refers to a divalent group derived from a straight or branched chain hydrocarbon of 2 to 50 carbon atoms, which contains at least one carbon-carbon double bond. Representative examples of alkenylenyl groups include, but are not limited to, —$C(H)$=$C(H)$—, —$C(H)$=$C(H)$—$CH_2$—, —$C(H)$=$C(H)$—$CH_2$—$CH_2$—, —$CH_2$—$C(H)$=$C(H)$—$CH_2$—, —$C(H)$=$C(H)$—$CH(CH_3)$—, and —$CH_2$—$C(H)$=$C(H)$—$CH(CH_2CH_3)$—. Alkenylenyl groups may be unsubstituted or substituted by one or more suitable substituents, as defined below.

The term "alkynyl," as used herein, refers to a straight or branched hydrocarbon radical, preferably having 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined below.

The term "alkynylenyl" or "alkynylene," as used herein, refers to a divalent unsaturated hydrocarbon group derived from a straight or branched chain hydrocarbon of 2 to 50 carbon atoms, and which has at least one carbon-carbon triple bond. Representative examples of alkynylenyl groups include, but are not limited to, —C≡C—, —C≡C—$CH_2$—, —C≡C—$CH_2$—$CH_2$—, —$CH_2$—C≡C—$CH_2$—, —C≡C—$CH(CH_3)$—, and —$CH_2$—C≡C—$CH(CH_2CH_3)$—. Alkynylenyl groups may be unsubstituted or substituted by one or more suitable substituents, as defined below.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined below.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cross-link," as used herein, refers to a bond that links one monomer unit of a polymer chain to another monomer unit of a polymer chain. The bond can be a covalent bond or an ionic bond.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroalkylenyl" or "heteroalkylene," as used herein, refers to a divalent group derived from a saturated, straight or branched hydrocarbon chain, in which at least one atom is a heteroatom such as O, S, N, Si or P. The terms "$C_1$-$C_{24}$ heteroalkylenyl," "$C_1$-$C_{12}$ heteroalkylenyl" and "$C_1$-$C_6$ heteroalkylene" refer to those heteroalkylene or heteroalkylenyl groups having from 1 to 24 atoms, 1 to 12 atoms or 1 to 6 member atoms, respectively, wherein the atoms are either carbon or a heteroatom. Representative examples of heteroalkylenyl groups include, but are not limited to, —O(CH$_2$CH$_2$O)$_n$— and O(CH$_2$CH$_2$CH$_2$O)$_n$—, wherein each n is independently 1 to 12. Heteroalkylenyl groups may be unsubstituted or substituted by one or more suitable substituents, as defined below.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined below.

The term "heterocycle," as used herein, refers to a monocyclic, bicyclic, or tricyclic group containing 1 to 4 heteroatoms selected from N, O, S(O)$_n$, NH or NR$^x$, wherein R$^x$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidinyl, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined below.

The term "high molecular weight," as used herein in connection with a water-soluble polymer, refers to a polymer that has a molecular weight of at least about 500 kDa. In some embodiments, the term "high molecular weight" refers to a polymer that has a molecular weight of at least about 5000 kDa.

The term "hydrodynamic volume," as used herein, refers to a measure of the size of the polymer in a composition, whereby the volume exerts a primary influence on the bulk viscosity of the composition of the polymer. Hydrodynamic volume may further refer to the volume of a polymer chain when it is in a composition. This may vary for a polymer depending on how well it interacts with the solvent, and the polymer's molecular weight. The solvent properties can be influenced by the concentration and type of ionic species dissolved within the solvent.

The term "hydrolyzable," as used herein, refers to a bond or a moiety that can be cleaved by the addition of water.

The term "hydrolyzable cross-link," as used herein, refers to a cross-link as defined above that may be cleaved by hydrolysis (addition of water).

The term "hydroxy," as used herein, refers to an —OH group.

"Member atom" as used herein refers to a polyvalent atom (e.g., a C, O, N, S or P atom) in a chain or ring system that constitutes a part of the chain or ring. For example, in pyridine, five carbon atoms and one nitrogen atom are member atoms of the ring. In diethyl ether, four carbon atoms and one oxygen atom are member atoms of the chain. Member atoms will be substituted up to their normal valence. For example, in an alkylenyl chain, each carbon atom will be substituted with two hydrogen atoms, or one hydrogen atom and one other substituent (e.g., an alkyl group or a hydroxyl group), or two substituents (e.g., two alkyl groups). Alternatively, a carbon atom can be substituted with an oxo group to form a —C(O)— group.

The term "oxo," as used herein, refers to a double bonded oxygen (=O) radical wherein the bond partner is a carbon atom. Such a radical can also be thought as a carbonyl group.

"Papermaking process" means a method of making paper and paperboard products from pulp comprising forming an aqueous cellulosic papermaking furnish (optionally, with mineral fillers, such as calcium carbonates, clays, etc.), draining the furnish to form a sheet, and drying the sheet. It should be appreciated that any suitable furnish may be used. Representative furnishes include, for example, virgin pulp, recycled pulp, kraft pulp (bleached and unbleached), sulfite pulp, mechanical pulp, polymeric plastic fibers, the like, any combination of the foregoing pulps. The steps of forming the papermaking furnish, draining and drying may be carried out in any manner generally known to those skilled in the art.

The term "substituent," as used herein, is intended to mean a chemically acceptable functional group that is "substituted" at any suitable atom of that group. Suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, groups of formula —$(OCH_2)_tOH$ wherein t is 1 to 25, and groups of formula -alkylenyl-$(OCH_2)_tOH$ wherein t is 1 to 25. Those skilled in the art will appreciate that many substituents can be substituted with additional substituents.

The term "viscosity," as used herein, expressed as the ratio of shear stress (force per unit area) to the shear rate (rate change of shear strain), refers to a fluid's resistance to flow. Viscosity may further be described as the internal friction of a moving fluid. A fluid with a high viscosity may resist motion because its molecular makeup provides significant internal friction. A fluid with low viscosity may flow easily because its molecular makeup results in very little friction when it is in motion.

"Wet end" may refer to that portion of a papermaking process involving an approach system, a sheet forming section and/or a pressing section.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. METHODS OF IMPROVING RETENTION AND DRAINAGE IN A PAPERMAKING PROCESS

Disclosed herein are methods of improving retention and drainage in papermaking processes. The methods comprise the steps of: providing a first composition comprising a water-soluble polymer having hydrolyzable cross-linked monomer units, the polymer comprising about 1 mol % to about 100 mol % acrylamide monomers; activating the first composition to hydrolyze the cross-linked monomer units to provide an activated polymer composition, wherein the activated polymer composition has a viscosity that is greater than the viscosity of the first composition; and adding the activated polymer composition to the papermaking process. The first composition can be in the form of a solution or an emulsion, and the activated polymer composition can be in the form of a solution or an emulsion.

The first composition comprising the water-soluble polymer can be activated to hydrolyze the cross-linked monomer units using a number of methods. In some embodiments, the first composition can be heated to activate hydrolysis of the cross-linked monomer units. For example, the first composition can be heated to a temperature of about 30° C. to about 100° C., e.g., about 30° C., 35° C., 40° C., 45° C., 50° C., 55° C., 60° C., 65° C., 70° C., 75° C., 80° C., 85° C., 90° C., 95° C. or 100° C. The first composition can be heated for about 30 minutes to about 24 hours, e.g., for about 30 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, or 24 hours.

In some embodiments, the first composition can be subjected to a change in ionic strength. This can be effected, for example, by adding a salt or a solution thereof to the first composition. The salt may be, for example, sodium chloride or the like.

In some embodiments, the first composition can be subjected to a change in pH. This can be effected, for example, by adding a base or a solution thereof to the first composition. The salt may be, for example, sodium hydroxide, potassium hydroxide, sodium bicarbonate, potassium bicarbonate, sodium carbonate, potassium carbonate, triethylamine or the like. The base may be added in an amount sufficient to increase the pH of the composition to about 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9 or 10.

The activated polymer composition may be added to a papermaking process involving virgin pulp, recycled pulp or combination thereof at any one or more of various locations during the papermaking process. Suitable locations may include a pulper, latency chest, reject refiner chest, disk filter or Decker feed or accept, whitewater system, pulp stock storage chest (either low density ("LD"), medium consistency (MC), or high consistency (HC)), blend chest, machine chest, headbox, saveall chest, paper machine whitewater system, and combinations thereof. The activated polymer composition may also be added to a pulp slurry in the papermaking process.

The activated polymer composition may be added in an amount effective to improve retention and drainage in a papermaking process. For example, the activated polymer composition may be added in an about of about 0.01 to about 2.0 lb per ton of papermaking furnish, or about 0.10 to about 1.0 lb per ton of papermaking furnish, e.g., 0.10, 0.125, 0.15, 0.175, 0.20, 0.225, 0.25, 0.275, 0.30, 0.325, 0.35, 0.375, 0.40, 0.425, 0.45, 0.475, 0.50, 0.525, 0.55, 0.575, 0.60, 0.625, 0.65, 0.675, 0.70, 0.725, 0.75, 0.775, 0.80, 0.825, 0.85, 0.875, 0.90, 0.925, 0.95, 0.975, or 1.00 lb per ton of papermaking furnish.

In some embodiments, the activated water-soluble polymers described herein may be effective as RDF aids in papermaking processes at lower doses than are required for conventional RDF aids. For example, the methods described herein may require a dose of the activated water-soluble polymer that is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35% less than a dose of a conventional water-soluble polymer, such as those used commercially as RDF aids in current papermaking processes. In embodiments, the methods may require a dose of the water-soluble polymer that is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35% less than a corresponding water-soluble polymer that lacks the hydrolyzable cross-linked monomers.

The performance of polymers as RDF aids can be evaluated using a method known as the first pass retention test, which uses a Britt CF Dynamic Drainage Jar developed by K. W. Britt of New York State University. The Britt Jar generally includes an upper chamber of about 1 liter capacity and a bottom drainage chamber, the chamber being separated by a support screen and a drainage screen. Below the drainage chamber is a downward extending flexible tube equipped with a clamp for closure. The upper chamber is provided with a variable speed, high torque motor equipped with a 2-inch 3-bladed propeller to create controlled shear conditions in the upper chamber. The test is conducted by placing a cellulosic slurry in the upper chamber and then subjecting the slurry to sequences involving commencing of shear stirring, adding of a starch and coagulant (if necessary), adding a test polymer, starting draining, and stopping draining and analyzing the filtrate. The entire sequence can take place over a time period of about one minute or a similar time frame. The material drained from the Britt jar (the "filtrate") is collected and filtered, and then the filter pad and filtrate are then dried and the dry mass of the filtrate is determined. The first pass retention value is calculated using the following formula:

$$\text{First Pass Retention (\%)} = \left(\frac{\text{Cellulosic slurry consistency} - \text{Filtrate consistency}}{\text{Cellulosic slurry consistency}}\right) \times 100$$

a. Water-Soluble Polymers

The methods involve adding to the papermaking process an activated polymer composition, which is prepared from a first composition comprising water-soluble polymers having hydrolyzable cross-linked monomer units. The hydrolyzable cross-linked monomer units are hydrolyzed upon activation by exposure to a stimulus, such as a change in temperature or chemical environment (e.g., pH, concentration or ionic strength). For example, the water-soluble polymers may be incorporated into a first composition, which may be subjected to a stimulus to activate hydrolysis of the hydrolyzable cross-links, thereby forming the activated polymer composition.

The hydrolyzable cross-linked monomer units may be cross-linked via a covalent hydrolyzable cross-linker, or via ionic interactions between a monomer unit bearing a charged hydrolyzable moiety and a monomer unit bearing an opposite charge.

When the polymers are dissolved in an aqueous solution, they provide the aqueous polymer solution with a relatively low viscosity. If the aqueous solution is subjected to altered conditions, such as an increase in temperature, a change in ionic strength, or a change in pH, the viscosity may increase to an amount greater than the starting solution viscosity, and/or an amount greater than the viscosity of an aqueous solution comprising the same polymer lacking the hydrolyzable cross-links.

The water-soluble polymers that may be used in the methods of the present invention comprise about 1 mol % to about 99 mol % acrylamide monomer units. For example, the polymer may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % acrylamide monomers. In some embodiments, the water-soluble polymers comprise about 20 mol % to about 80 mol % acrylamide monomers. In some embodiments, the water-soluble polymers comprise about 60 mol % to about 80 mol % acrylamide monomers.

The water-soluble polymer may comprise additional monomer units, which may be selected from the group consisting of: acrylic acid or a salt thereof, methacrylic acid or a salt thereof, 2-acrylamido-2-methylpropane sulfonic acid or a salt thereof, acrolein, styrene sulfonic acid or a salt thereof, N-vinyl formamide, N-vinyl pyrrolidone, N,N-dimethylaminoethyl acrylate or a quaternized salt thereof, N,N-dimethylaminoethyl methacrylate or a quaternized salt thereof, N,N-dimethylaminopropyl acrylamide or a quaternized salt thereof, N,N-dimethylaminopropyl methacrylamide or a quaternized salt thereof, N,N-dimethyldiallylammonium chloride, N,N-diallylamine, and a hydrophobic monomer such as lauryl methacrylate. For example, the water-soluble copolymer may further comprise monomer units selected from the group consisting of acrylic acid or a salt thereof, 2-acrylamido-2-methylpropane sulfonic acid or a salt thereof, acrolein, dimethylaminoethylacrylate methyl chloride quaternary salt (DMAEA.MCQ), and dimethylaminoethylmethacrylate methyl chloride quaternary salt (DMAEM.MCQ). If present, each of the above monomer units may be included in a polymer in an amount of about 1 mol % to about 99 mol %. For example, the polymer may comprise about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99 mol % of the above monomer units. In some embodiments, the water-soluble polymers comprise about 10 mol % to about 60 mol % of the above monomer units. In some embodiments, the water-soluble polymers comprise about 20 mol % to about 40 mol % of the above monomer units.

The water-soluble polymer may be a homopolymer (e.g., a homopolymer of acrylamide), or a copolymer or a terpolymer. In the case of copolymers and terpolymers, the polymer may be any form of copolymer or terpolymer, such as an alternating copolymer, a periodic copolymer, a random copolymer, or a block copolymer (e.g., a diblock copolymer or a triblock copolymer). The polymer may be a linear polymer or a branched polymer (e.g., a hyperbranched polymer or a dendritic polymer).

Following exposure of a composition comprising the water-soluble polymer to an external stimulus such as an increase in temperature or a change in chemical environment such as pH, concentration or ionic strength, and hydrolysis of any cross-linked monomer units, the water-soluble polymer may have a molecular weight of greater than about 500 kDa, or from about 500 kDa to about 50000 kDa, or from about 1000 kDa to about 25000 kDa. For example, a water-soluble polymer may have a molecular weight of about 500 kDa, 600 kDa, 700 kDa, 800 kDa, 900 kDa, 1000 kDa, 1100 kDa, 1200 kDa, 1300 kDa, 1400 kDa, 1500 kDa, 1600 kDa, 1700 kDa, 1800 kDa, 1900 kDa, 2000 kDa, 2100 kDa, 2200 kDa, 2300 kDa, 2400 kDa, 2500 kDa, 2600 kDa, 2700 kDa, 2800 kDa, 2900 kDa, 3000 kDa, 3100 kDa, 3200 kDa, 3300 kDa, 3400 kDa, 3500 kDa, 3600 kDa, 3700 kDa, 3800 kDa, 3900 kDa, 4000 kDa, 4100 kDa, 4200 kDa, 4300 kDa, 4400 kDa, 4500 kDa, 4600 kDa, 4700 kDa, 4800 kDa, 4900 kDa, 5000 kDa, 5100 kDa, 5200 kDa, 5300 kDa, 5400 kDa, 5500 kDa, 5600 kDa, 5700 kDa, 5800 kDa, 5900 kDa, 6000 kDa, 6100 kDa, 6200 kDa, 6300 kDa, 6400 kDa, 6500 kDa, 6600 kDa, 6700 kDa, 6800 kDa, 6900 kDa, 7000 kDa, 7100 kDa, 7200 kDa, 7300 kDa, 7400 kDa, 7500 kDa, 7600 kDa, 7700 kDa, 7800 kDa, 7900 kDa, 8000 kDa, 8100 kDa, 8200 kDa, 8300 kDa, 8400 kDa, 8500 kDa, 8600 kDa, 8700 kDa, 8800 kDa, 8900 kDa, 9000 kDa, 9100 kDa, 9200 kDa, 9300 kDa, 9400 kDa, 9500 kDa, 9600 kDa, 9700 kDa, 9800 kDa, 9900 kDa, 10000 kDa, 11000 kDa, 12000 kDa, 13000 kDa, 14000 kDa, 15000 kDa, 16000 kDa, 17000 kDa, 18000 kDa, 19000 kDa, 20000 kDa, 21000 kDa, 22000 kDa, 23000 kDa, 24000 kDa, 25000 kDa, 26000 kDa, 27000 kDa, 28000 kDa, 29000 kDa, 30000 kDa, 31000 kDa, 32000 kDa, 33000 kDa, 34000 kDa, 35000 kDa, 36000 kDa, 37000 kDa, 38000 kDa, 39000 kDa, 40000 kDa, 41000 kDa, 42000 kDa, 43000 kDa, 44000 kDa, 45000 kDa, 46000 kDa, 47000 kDa, 48000 kDa, 49000 kDa or 50000 kDa. Molecular weights may be higher than 50000 kDa in the event of that some of the cross-links remain unhydrolyzed.

Following activation of the polymer and hydrolysis of any cross-linked monomer units, the water-soluble polymer may have a charge level (e.g., an anionic charge level) of about 10 to about 75 mol %. For example, a water-soluble polymer may have a charge level of about 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, 25 mol %, 26 mol %, 27 mol %, 28 mol %, 29 mol %, 30 mol %, 31 mol %, 32 mol %, 33 mol %, 34 mol %, 35 mol %, 36 mol %, 37 mol %, 38 mol %, 39 mol %, 40 mol %, 41 mol %, 42 mol %, 43 mol %, 44 mol %, 45 mol %, 46 mol %, 47 mol %, 48 mol %, 49 mol %, 50 mol %, 51 mol %, 52 mol %, 53 mol %, 54 mol %, 55 mol %, 56 mol %, 57 mol %, 58 mol %, 59 mol %, 60 mol %, 61 mol %, 62 mol %, 63 mol %, 64 mol %, 65 mol %, 66 mol %, 67 mol %, 68 mol %, 69 mol %, 70 mol %, 71 mol %, 72 mol %, 73 mol %, 74 mol %, or 75 mol %. In some embodiments, the water-soluble polymers have a charge level of about 10 mol % to about 60 mol %. In some embodiments, the water-soluble polymers have a charge level of about 10 mol % to about 40 mol %.

(1) Hydrolyzable Ionic Cross-Links

The water-soluble polymers may include monomer units that are cross-linked via an ionic interaction, between a monomer unit bearing a charged hydrolyzable moiety, and a monomer unit bearing an opposite charge. For example, ionically cross-linked monomer units may include a monomer unit bearing a hydrolyzable positively charged moiety, such as a quaternary amine, which interacts with a negatively charged moiety on the polymer. In another example, ionically cross-linked monomer units may include a monomer unit bearing a hydrolyzable negatively charged moiety, such as a carboxylic acid, which interacts with a positively charged moiety on the polymer such as a quaternary amine.

For example, the water-soluble polymer may include at least one monomer-derived mer unit having the following formula (I):

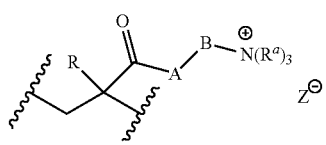

(I)

wherein:
R is selected from the group consisting of —H, $C_1$-$C_{24}$ alkyl, $C_2$-$C_{24}$ alkenyl and $C_2$-$C_{24}$ alkynyl;
each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;
A is selected from the group consisting of O, S and $NR^b$;
$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;
$Z^\ominus$ is an anion; and
each $\sim\!\!\sim\!\!\sim$ represents a point of attachment to the polymer backbone.

In some embodiments, R is —H. In some embodiments, R is —$CH_3$. In some embodiments, A is O. In some embodiments, A is NH. In some embodiments, B is $C_2$ alkylenyl (i.e. —$CH_2$—$CH_2$—). In some embodiments, B comprises at least one ethylene glycol (i.e. —O—$CH_2$—$CH_2$—O—) or propylene glycol (i.e. —O—$CH_2$—$CH_2$—$CH_2$—O—) moiety. In some embodiments, each $R^a$ is —$CH_3$. $Z^\ominus$ is any suitable anion, such as a halide (e.g., fluoride, chloride, bromide or iodide), acetate, benzenesulfonate, benzoate, bicarbonate, nitrate, methanesulfonate, p-toluenesulfonate, or the like. In some embodiments, $Z^\ominus$ is chloride or methanesulfonate.

Exemplary hydrolyzable monomer units that include positively charged moieties are N,N-dimethylaminoethyl acrylate methyl chloride quaternary salt (DMAEA.MCQ), N,N-dimethylaminoethyl methacrylate methyl chloride quaternary salt (DMAEM.MCQ), N,N-dimethylaminopropyl acrylamide methyl chloride quaternary salt, and N,N-dimethylaminopropyl methacrylamide methyl chloride quaternary salt.

As an example of a hydrolyzable ionic cross-link, a monomer unit that is a DMAEA.MCQ or DMAEM.MCQ monomer unit may interact with an acrylate monomer unit to form an ionic cross-link. The ester moiety of the DMAEA.MCQ or DMAEM.MCQ may undergo hydrolysis to release the positively charged quaternary salt group, thereby breaking the cross-link.

Ionically cross-linked polymers may be prepared by polymerizing a mixture of monomers, which includes monomers bearing a charged hydrolyzable moiety, and monomer units bearing an opposite charge. For example, a polymer may be prepared by polymerizing a mixture comprising acrylamide monomers, acrylate monomers (e.g., sodium acrylate), and monomers having the following formula (Ia):

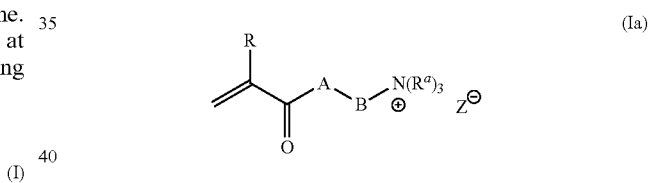

(Ia)

wherein:
R is selected from the group consisting of —H, $C_1$-$C_{24}$ alkyl, $C_2$-$C_{24}$ alkenyl and $C_2$-$C_{24}$ alkynyl;
each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;
A is selected from the group consisting of O, S and $NR^b$;
$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl; and
$Z^\ominus$ is an anion.

In some embodiments, R is —H. In some embodiments, R is —$CH_3$. In some embodiments, A is O. In some embodiments, A is NH. In some embodiments, B is $C_2$ alkylenyl (i.e. —$CH_2$—$CH_2$—). In some embodiments, B comprises at least one ethylene glycol (i.e. —O—$CH_2$—$CH_2$—O—) or propylene glycol (i.e. —O—$CH_2$—$CH_2$—$CH_2$—O—) moiety. In some embodiments, each $R^a$ is —$CH_3$. $Z^\ominus$ is any suitable anion, such as a halide (e.g., fluoride, chloride, bromide or iodide), acetate, benzenesulfonate, benzoate, bicarbonate, nitrate, methanesulfonate, p-toluenesulfonate, or the like. In some embodiments, $Z^{\ominus}$ is chloride or methanesulfonate.

Following polymerization to produce the ionically cross-linked polymer, the positively charged monomer units derived from the monomers of formula (Ia) will interact ionically with negatively charged monomer units derived from the acrylate monomers, to generate the ionic cross-link. When included in a water-soluble polymer, ionic cross-linked monomer units may be present in the polymer at an amount of about 1 mol % to about 25 mol %, or about 1 mol % to about 10 mol %, of the total monomer units in the polymer. For example, ionic cross-linked monomer units may be included in the polymer at an amount of about 1 mol %, 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, or 25 mol % of the total monomer units in the polymer.

(2) Hydrolyzable Covalent Cross-Links

The polymers may include monomer units that are cross-linked via a covalent hydrolyzable cross-linker. As an example of a hydrolyzable covalent cross-linking, two monomer units may be cross-linked via a moiety that includes at least one hydrolyzable group such as an ester, carbonate, oxalate, acetal, hemiacetal, hemiaminal, or the like. The cross-linking moiety may include up to about 1000 member atoms, and may include linear and/or branched chains, ring structures, and optional substituents. Any suitable moiety capable of cross-linking two monomer units and having at least one hydrolyzable group may be used.

For example, the covalently cross-linked monomer units may have the following formula (II):

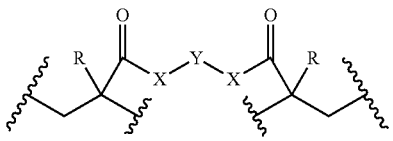

wherein:
each X is selected from the group consisting of O, S and $NR^b$;
each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
Y is selected from a group consisting of a bond and a linker comprising 1 to about 100 member atoms; and
each ⁓ represents a point of attachment to a first polymer backbone, and each ⁓ represents a point of attachment to the first polymer backbone or a second polymer backbone.

In some embodiments, each X is O. In some embodiments, each X is NH. In some embodiments, Y is a bond. In some embodiments, Y is a $C_1$-$C_{30}$ alkylenyl group. In some embodiments, Y comprises at least one oxalate group. In some embodiments, Y comprises at least one carbonate group. In some embodiments, Y comprises at least one ethylene glycol moiety (i.e. —OCH$_2$CH$_2$O—). In some embodiments, Y comprises at least one propylene glycol moiety (i.e. —OCH$_2$CH$_2$CH$_2$O—).

For example, the covalently linked monomer units of formula (II) may have any of the following formulae:

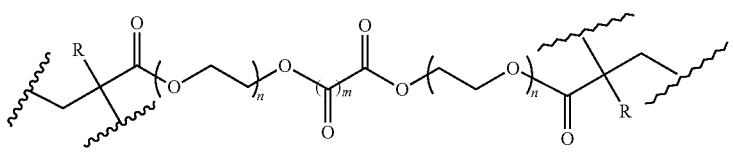

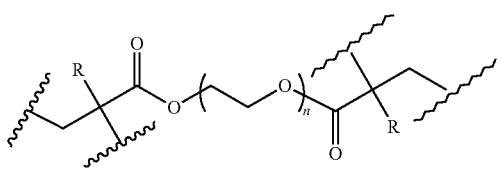
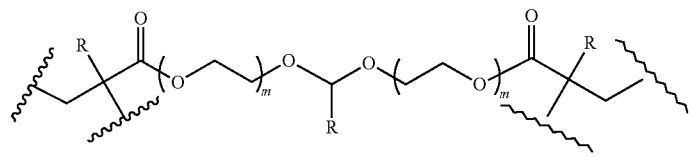

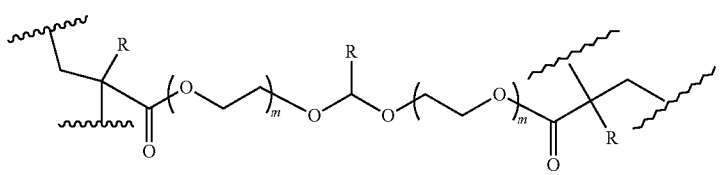

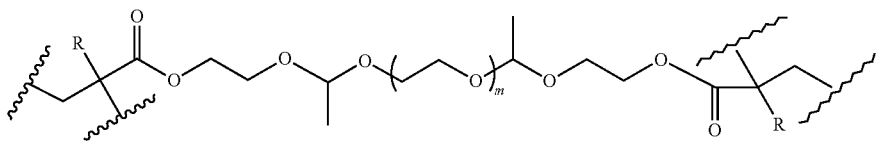

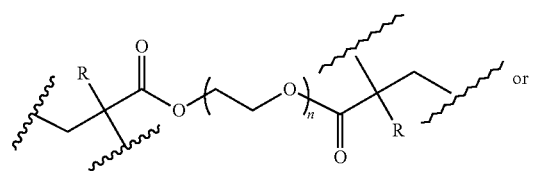 or 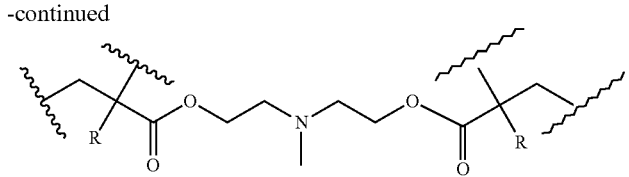

wherein each m is 1, 2, 3, 4, 5, 6, 7, 8, 9, 10, 11 or 12; each n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30; each p is 0 or 1; each R is independently selected from the group consisting of —H and —CH$_3$; and each R$^1$ is independently selected from the group consisting of —H and C$_1$-C$_{12}$ alkyl. The covalently linked monomer units may have the following formula (IIa):

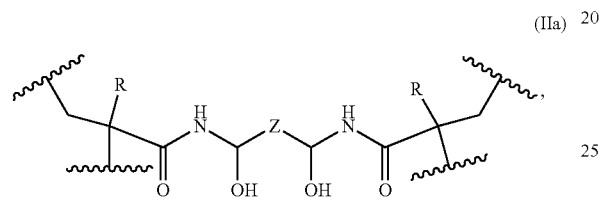

(IIa)

wherein:
each R is independently selected from the group consisting of —H and —CH$_3$;
Z is selected from the group consisting of a bond and a C$_1$-C$_{12}$ alkylenyl group; and each ～ represents a point of attachment to a first polymer backbone, and each ⋀⋀ represents a point of attachment to the first polymer backbone or a second polymer backbone.

In an embodiment of formula (IIa), the covalently linked monomer units may have the following formula (IIb):

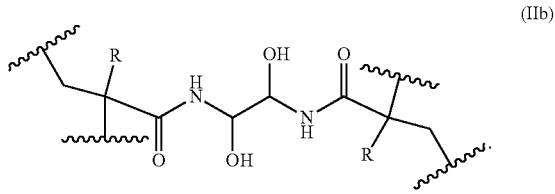

(IIb)

Other examples of cross-linked monomer units include those having phenylene groups, quaternary amine groups, carbonate groups, and the like. For example, covalently linked monomer units may have any of the following formulae:

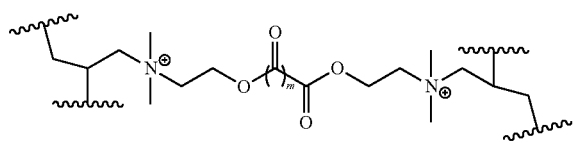 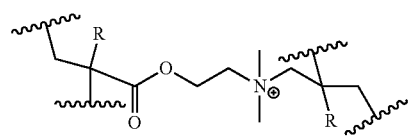

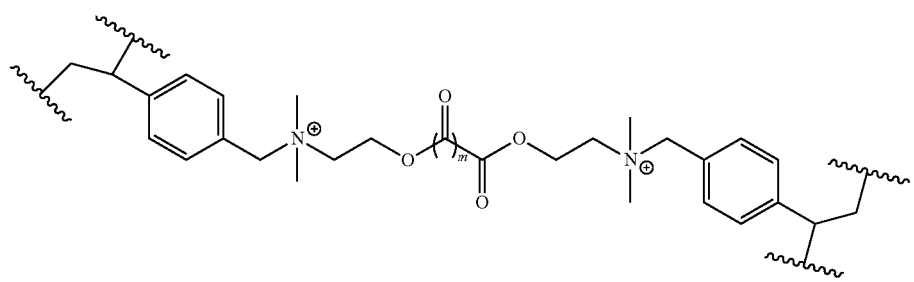

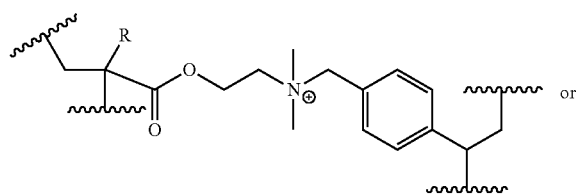 or 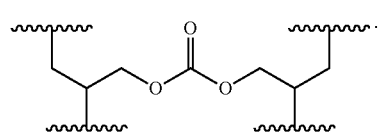

Other examples of cross-linked monomer units include those that provide more than two points of attachment to the backbone of the polymer chain. Examples of such cross-linked monomer units include the following:

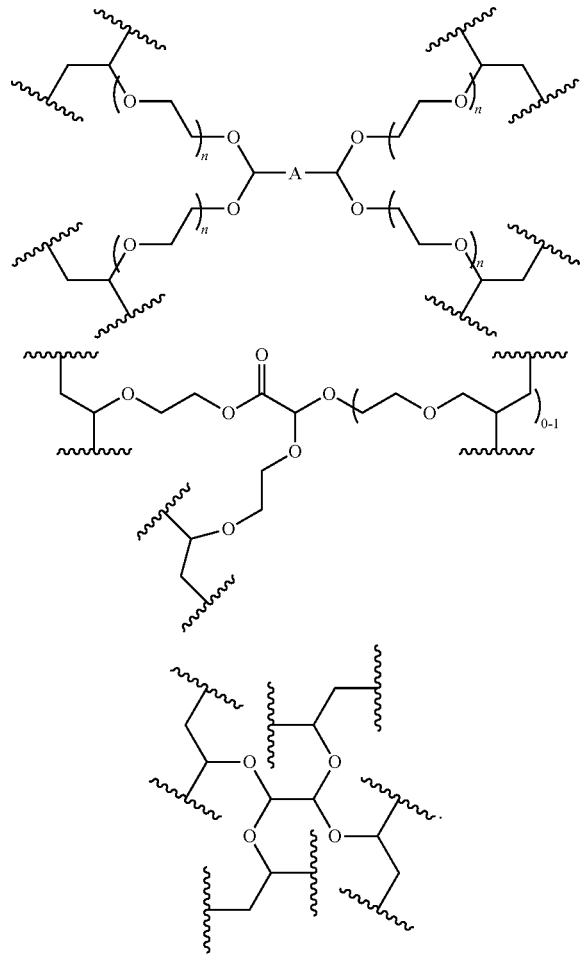

The above-identified cross-linked monomer units may be generated in a number of different ways. For example, two acrylamide or methacrylamide monomer units may be cross-linked by adding a dialdehyde compound to a solution of the polymer. Suitable dialdehyde compounds include but are not limited to glyoxal, glutaraldehyde, starch dialdehyde, or any compound having two or more aldehyde groups.

Alternatively, monomer units of the polymer may be cross-linked during the synthesis of the polymer, by including in the polymerization reaction a monomer having the following formula (III):

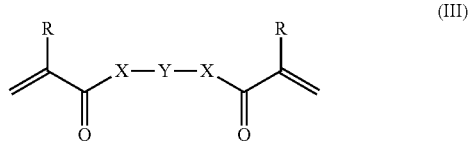

each X is selected from the group consisting of O, S and $NR^b$;

each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and Y is selected from a group consisting of a bond and a linker comprising 1 to about 100 member atoms.

The monomer of formula (III) may be formed immediately prior to the polymerization process, e.g., by adding a dialdehyde compound to a solution of an acrylamide or methacrylamide monomer immediately prior to the polymerization reaction. Alternatively, the monomer of formula (III) may be prepared in situ by adding a dialdehyde compound to a reaction mixture during the polymerization reaction.

An exemplary monomer unit may have the following formula (IIIa):

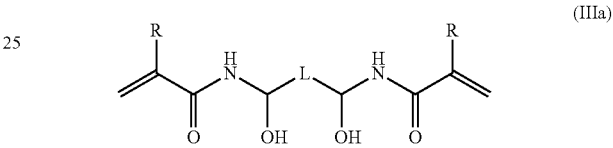

wherein:
each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl; and L is selected from the group consisting of a bond and an optionally substituted $C_1$-$C_{12}$ alkylenyl group.

A particular example of a compound that can be included during synthesis of the polymer is N,N'-(1,2-dihydroxyethylene)bisacrylamide, also known as glyoxal bis(acrylamide). Glyoxal bis(acrylamide) may be added to the polymerization reaction, or it may be formed immediately prior to or during the polymerization process, by, for example, the addition of glyoxal to the polymerization reaction.

As another example, a direct hydrolyzable covalent bond may form between two monomer units. In such examples, a polymer having an acrylamide or methacrylamide monomer unit and an acrolein monomer unit may undergo a reaction to form a covalent bond, e.g., as follows:

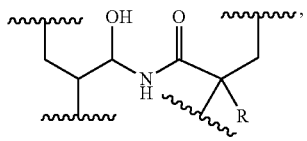

wherein:
R is selected from the group consisting of —H, optionally substituted $C_1$-$C_{24}$ alkyl, optionally substituted $C_2$-$C_{24}$ alkenyl and optionally substituted $C_2$-$C_{24}$ alkynyl, and each ⁀⁀ represents a point of attachment to a first polymer backbone, and each ⁀⁀ represents a point of attachment to the first polymer backbone or a second polymer backbone.

In some embodiments, R is selected from the group consisting of —H and —$CH_3$.

In embodiments in which hydrolyzable covalently cross-linked monomer units are included in a polymer, either by including a bifunctional hydrolyzable monomer unit in the polymerization such as a compound of formula (III), or by adding a dialdehyde compound as a cross-linker, the cross-linked monomer units may be included in a polymer in an amount of about 0.1 ppm to about 20000 ppm based on the weight of the polymer. For example, the cross-linked monomer units may be included in a polymer in an amount of about 0.1 ppm to about 10000 ppm, about 0.1 ppm to about 5000 ppm, about 0.1 ppm to about 1000 ppm, or about 0.1 ppm to about 100 ppm. For example, the cross-linked monomer units may be included in a polymer in an amount of about 0.1 ppm, 0.2 ppm, 0.3 ppm, 0.4 ppm, 0.5 ppm, 0.6 ppm, 0.7 ppm, 0.8 ppm, 0.9 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, 10000 ppm, 11000 ppm, 12000 ppm, 13000 ppm, 14000 ppm, 15000 ppm, 16000 ppm, 17000 ppm, 18000 ppm, 19000 ppm, or 20000 ppm.

(3) Methods of Synthesis

The water-soluble polymers can be synthesized by any means known in the art, such as, for example, radical polymerization. For example, representative polymers can be prepared by the free radical polymerization of acrylamide and other vinyl monomers, including, optionally, a hydrolyzable crosslinking monomer (e.g., a compound of formula (Ia), or a compound of formula (III) or (IIIa), such as glyoxal bis(acrylamide)). Other additives can optionally be added, including ones that can form the desired hydrolyzable cross-links in the polymer prior to, during, or after the polymerization reaction.

In a typical synthesis, the monomer(s) are dissolved in water and the pH of the monomer solution is adjusted to a target level. The monomer solution is then purged with an inert gas such as nitrogen in order to remove all traces of oxygen, which would otherwise inhibit the free radical polymerization reaction. Optionally, the monomer solution can be suspended in an emulsion formed by the addition of a water-immiscible solvent such as a hydrocarbon oil, along with emulsifying surfactants such as sorbitan monooleate and/or ethoxylated sorbitan monostearates. Polymerization is then initiated via the addition of a small amount of a free radical initiator. The free radical initiators generally decompose to generate free radicals by thermal, photochemical, redox, or hybrid mechanisms. Examples of thermal initiators include, but are not limited to, azo compounds such as 2,2'-azobisisobutryonitrile. Examples of redox initiators include, but are not limited to, t-butylhydroperoxide/ferrous ion and ammonium persulfate/sodium bisulfite. The polymerization reaction is most often conducted between the temperatures of about 10° C. and about 110° C.

Once the polymerization reaction is completed, an optional step may be performed in order to reduce the residual monomer content of the product. This is accomplished, when desired, by means of heating the reaction product for an additional time period, or by the addition of additional initiators or other additives that will react with the residual monomer, or by a combination of both means. Additional processing steps can be optionally performed in order to, for example, adjust the product pH, or remove water or other solvents from the reaction product in order to produce a solid polymer product. The final polymer product form is thus dictated by the choice of the formula and the processing steps employed, so that a polymer product comprised of a liquid solution, a liquid emulsion, or a dry solid may be produced.

In an exemplary embodiment of formula (IIIa), the hydrolyzable crosslinker structure shown is comprised of a glyoxal-derived moiety and two acrylamide-derived moieties. This type of hydrolysable crosslink can be produced in the polymer by a variety of means, since the reaction used to form the crosslink can be carried out under reversible reaction conditions. For example, glyoxal bis(acrylamide) monomer, formed by a separate reaction between glyoxal and acrylamide, can be added as a comonomer to the polymerization reaction. Alternatively, glyoxal bis(acrylamide) can be formed in the polymerization reaction mixture immediately prior to polymerization, by the addition of glyoxal to the acrylamide-containing monomer reaction solution, under appropriate conditions. Alternatively, glyoxal can be added to the final reaction product after the polymerization reaction, where it can be expected to react with the polymer to form the desired hydrolyzable cross-links, under the appropriate conditions. One skilled in the art would recognize that any compound that generates glyoxal under these reaction conditions could also be used in place of glyoxal in these reactions. Such compounds include, but are not limited to, hydrolyzable polymers containing glyoxal, adducts formed from glyoxal and amines, adducts formed from glyoxal and amides, or acetals formed from glyoxal.

b. Viscosity

Prior to activation, a first polymer composition may have a viscosity of about 0 cPs to about 100 cPs. For example, the first polymer composition may have a viscosity of about 0 cPs, 0.001 cPs, 0.01 cPs, 0.1 cPs, 0.2 cPs, 0.3 cPs, 0.4 cPs, 0.5 cPs, 0.6 cPs, 0.7 cPs, 0.8 cPs, 0.9 cPs, 1 cPs, 2 cPs, 3 cPs, 4 cPs, 5 cPs, 6 cPs, 7 cPs, 8 cPs, 9 cPs, 10 cPs, 15 cPs, 20 cPs, 25 cPs, 30 cPs, 35 cPs, 40 cPs, 45 cPs, 50 cPs, 55 cPs, 60 cPs, 65 cPs, 70 cPs, 75 cPs, 80 cPs, 85 cPs, 90 cPs, 95 cPs or 100 cPs. In some embodiments, a first polymer composition may have a viscosity of about 0.001 cPs to about 100 cPs. In some embodiments, a first polymer composition may have a viscosity of about 0.01 cPs to about 100 cPs. In some embodiments, a first polymer composition may have a viscosity of about 0.1 cPs to about 20 cPs. In some embodiments, a first polymer composition may have a viscosity of about 0.1 cPs to about 10 cPs.

After exposure to a stimulus or a change in conditions such as temperature, pH, concentration, ionic strength or the like, the viscosity of the activated polymer composition may be about the same or higher than a viscosity of the first polymer composition prior to the stimulus, or the viscosity may be about the same or higher than the viscosity of an first polymer composition comprising a corresponding water-soluble polymer that lacks the hydrolyzable cross-links. For example, after activation, the activated polymer composition may have a viscosity of about 1 cPs to about 5000 cPs, e.g., 1 cPs, 5 cPs, 10 cPs, 20 cPs, 30 cPs, 40 cPs, 50 cPs, 60 cPs, 70 cPs, 80 cPs, 90 cPs, 100 cPs, 150 cPs, 200 cPs, 250 cPs, 300 cPs, 350 cPs, 400 cPs, 450 cPs, 500 cPs, 550 cPs, 600 cPs, 650 cPs, 700 cPs, 750 cPs, 800 cPs, 850 cPs, 900 cPs, 950 cPs, 1000 cPs, 1100 cPs, 1200 cPs, 1300 cPs, 1400 cPs, 1500 cPs, 1600 cPs, 1700 cPs, 1800 cPs, 1900 cPs, 2000 cPs, 2100 cPs, 2200 cPs, 2300 cPs, 2400 cPs, 2500 cPs, 2600 cPs, 2700 cPs, 2800 cPs, 2900 cPs, 3000 cPs, 3100 cPs, 3200 cPs, 3300 cPs, 3400 cPs, 3500 cPs, 3600 cPs, 3700 cPs, 3800 cPs, 3900 cPs, 4000 cPs, 4100 cPs, 4200 cPs, 4300 cPs, 4400 cPs, 4500 cPs, 4600 cPs, 4700 cPs, 4800 cPs, 4900 cPs, or 5000 cPs.

c. Additional Components

In addition to the water-soluble polymer, the first polymer composition and/or the activated polymer composition may optionally include one or more further additives. Such papermaking additives include, for example, other retention aids (e.g., microparticles, flocculants, polymeric and inorganic coagulants, etc.), wet and dry strength additives (e.g., cationic starches, polyamidoamine epichlorohydrin-based polymers), fillers, dyes, optical brightening agents, sizing agents, fixatives, detackifiers, dispersants, the like, and combinations of the foregoing.

3. EXAMPLES

The foregoing may be better understood by reference to the following examples, which are presented for purposes of illustration and are not intended to limit the scope of the invention. All reagents were purchased from commercial sources and used as received unless stated otherwise. N,N'-(1,2-dihydroxyethylene)bisacrylamide, also known as glyoxal bis(acrylamide) is abbreviated herein as GBA.

Example 1

Synthesis of Polymers 1a, 1b, 1c and 1d

Polymer 1a includes of 29 mole percent sodium acrylate, 71 mole percent acrylamide, and 3.5 ppm GBA hydrolyzable crosslinker (based on the total formula). The polymer was prepared by polymerizing a monomer emulsion consisting of an aqueous mixture of 25.0 g of 50% acrylamide, 5.39 g of acrylic acid, 16.00 g water, neutralized with 5.90 g 50% aqueous sodium hydroxide. In addition, 0.006 g of tetrasodium diethylenediaminetetraaacetate, and 0.026 g of a freshly-prepared 1% aqueous solution of (1,2-dihydroxyethylene)bisacrylamide (GBA) were added to the aqueous monomer solution The aqueous monomer solution was dispersed in an oil phase comprised of a solution of 21.00 g petroleum distillate, 1.0 g sorbitan monooleate and 0.61 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 2,2'-azobisisobutryonitrile at a reaction temperature of 45° C. The reaction temperature of the polymerization is maintained at 45° C. for 4 hours, then heated to 57° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

The above procedure was also repeated at 1 kg and 2.4 kg scales, providing polymers 1b and 1c, respectively. Polymer 1d was prepared similarly.

Example 2

Preparation of Polymer 2

Polymer 2 was prepared by polymerizing a monomer emulsion consisting of an aqueous mixture of 24.9 g of 50% acrylamide, 4.6 g of N,N-dimethylaminoethyl acrylate methyl-chloride quaternary salt, 10.2 g water, neutralized with 0.078 g 50% aqueous sodium hydroxide. In addition, 0.006 g of tetrasodium diethylenediaminetetraaacetate, 0.54 g Adipic Acid, 1.79 g sodium chloride, 0.60 g urea, and 0.213 g of a freshly-prepared 0.1% aqueous solution of GBA were added to the aqueous monomer solution. The aqueous monomer solution was dispersed in an oil phase comprised of a solution of 15.57 g petroleum distillate, 0.73 g sorbitan monooleate and 0.73 g ethoxylated sorbitan monostearate. If necessary the monomer phase pH was adjusted to ~4 using 50% aqueous sodium hydroxide or concentrated hydrochloric acid.

The monomer emulsion was prepared by mixing the aqueous phase and the oil phase under shear for 30-60 minutes, followed by deoxygenation with nitrogen for 30 minutes. Polymerization was initiated by adding 0.0095 g 2,2'-azobisisobutryonitrile and 0.0012 g 2,2'-Azobis (2,4-Dimethyl Valeronitrile) at a reaction temperature of 45° C. The reaction temperature of the polymerization was maintained at 45° C. for 3 hours, then heated to 70° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 3

Preparation of Polymers 3a, 3b and 3c

Polymer 3a was prepared by polymerizing a monomer emulsion consisting of an aqueous mixture of 381.375 g of 50.20% acrylamide, 78.730 g of acrylic acid, and 178.050 g water which was neutralized in an ice-bath with 50% aqueous sodium hydroxide (86.500 g). In addition, 0.300 g of a freshly-prepared 2% aqueous solution of glyoxal was added to the aqueous monomer solution. The aqueous monomer solution was warmed and stirred for period sufficient for the required (1,2-dihydroxyethylene)bisacrylamide (GBA) to be formed in situ. 0.090 g Of tetrasodium diethylenediaminetetraaacetate was then added to the prepared monomer phase.

The aqueous monomer solution was then dispersed in an oil phase comprised of a solution of 253.350 g petroleum distillate, 12.220 g sorbitan monooleate, and 7.300 g ethoxylated sorbitan monostearate.

The monomer emulsion was prepared by mixing the aqueous phase and the oil phase under shear for 30-60 minutes, followed by addition of 0.528 g of 2,2'-azobisisobutryonitrile and nitrogen purging. The reaction temperature of the polymerization was maintained at 44° C. for 3.5 hours with nitrogen purging and then heated to 57° C. for an additional hour.

Dissolution of the polymer emulsion in water is affected by mixing the emulsion into a large volume of water under shear, in the presence of a high HLB nonionic surfactant at a level less than about 5% of the weight of the emulsion polymer.

Polymers 3b and 3c were prepared following the same procedure using different levels of glyoxal in the formula: 0.600 g of a 2% glyoxal solution for 3b and 1.200 g of a 2% glyoxal solution for 3c.

Example 4

Preparation of Polymer 4

Polymer 4 was prepared by first preparing a 30 mol % sodium acrylate acrylamide emulsion copolymer using a similar method to Example 1, followed by post-treatment with glyoxal. A 100 g sample of a 30 mol % sodium acrylate acrylamide emulsion copolymer was treated under shear with 0.032 g of a 40% glyoxal solution. The mixture was stirred 15 minutes at 25° C. then stored without agitation for 24 hours at 40° C.

Dissolution of the polymer emulsion in water was affected by mixing the emulsion into a large volume of water under shear, in the presence of a high HLB nonionic surfactant at a level less than about 5% of the weight of the emulsion polymer.

Example 5

Preparation of Polymer 5

Polymer 5, a temporary ionic crosslinked emulsion polymer, was prepared by polymerizing a monomer emulsion consisting of an aqueous mixture of 25.00 g of 50% acrylamide, 4.30 g of acrylic acid, 16.21 g water, neutralized with 4.3 g 50% aqueous sodium hydroxide. In addition, 3.70 g of an 80% solution of N,N-dimethylaminoethyl acrylate, methyl chloride quaternary salt and 0.007 g of tetrasodium diethylenediaminetetraaacetate were added to the aqueous monomer solution. The aqueous monomer solution was then dispersed in an oil phase comprised of a solution of 21.00 g petroleum distillate, 1.01 g sorbitan monooleate, and 0.61 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 0.038 g 2,2'-azobisisobutryonitrile at a reaction temperature of 45° C. The reaction temperature of the polymerization is maintained at 45° C. for 4 hours and then heated to 58° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 6

Preparation of Polymer 6

Polymer 6, a diester crosslinked emulsion polymer, was prepared by polymerizing a monomer emulsion consisting of an aqueous mixture of 25.00 g of 50% acrylamide, 5.39 g of acrylic acid, 15.22 g water, neutralized with 5.90 g 50% aqueous sodium hydroxide. In addition, 0.784 g of a 0.1% solution of tetraethyleneglycol diacrylate crosslinker and 0.007 g of tetrasodium diethylenediaminetetraaacetate were added to the aqueous monomer solution. The aqueous monomer solution was then dispersed in an oil phase comprised of a solution of 19.00 g petroleum distillate, 0.917 g sorbitan monooleate, and 0.55 g ethoxylated sorbitan monostearate.

The monomer emulsion was prepared by mixing the aqueous phase and the oil phase under shear for 30-60 minutes, followed by deoxygenation with nitrogen for 30 minutes. Polymerization is initiated by adding 0.038 g 2,2'-azobisisobutryonitrile at a reaction temperature of 45° C. The reaction temperature of the polymerization is maintained at 45° C. for 4 hours, then heated to 58° C. for an additional hour.

Dissolution of the polymer emulsion in water was effected by mixing the emulsion into a large volume of water under shear, in the presence of a high HLB nonionic surfactant at a level less than about 5% of the weight of the emulsion polymer.

Example 7

Polymer Activation Procedures

The temporary-crosslinked polymers were activated in order to hydrolyze the temporary crosslinks and increase the solution viscosity of the polymer solutions derived from them. This can be accomplished by heating, or by changing the pH, or by a combination of heat and pH, for a specified time period. The polymers can be activated either in the emulsion product form, or after make down of the emulsion to produce dilute polymer solutions. Activation of the polymers in the emulsion product form, during the manufacture of the emulsion polymer product, is preferred. Typical procedures are provided here for Polymers 7a and 7b. For polymer 7a, the crosslinked emulsion polymer described in Example 1c was heated for three hours at 70° C. after the polymerization reaction was completed. For polymer 7b, the crosslinked emulsion polymer described in Example 1c was pH-adjusted by the addition of 0.5 wt. % sodium carbonate after the polymerization reaction was completed, and then heated for 3 hours at 70 C. The Table below describes the viscosities of the polymer solutions before (polymer 1c) and after activation (polymers 7a and 7b). The viscosities were measured after the polymers were dissolved in 3.5 wt. % synthetic sea water at 3000 ppm polymer concentration by mixing the emulsion polymer into a large volume of synthetic sea water under shear, in the presence of a high HLB nonionic surfactant at a level less than about 5% of the weight of the polymer. The bulk viscosities of the polymer solutions were measured at a shear rate of $10.2$ $s^{-1}$. Viscosities are presented in Table 1.

TABLE 1

Activation or Removal of the Temporary Crosslinks in the Polymer

| Polymer | Unactivated Polymer 1c viscosity | Activated Polymer 7 viscosities | Activation Procedure |
| --- | --- | --- | --- |
| Polymer 7a | 1.56 | 110.19 | Heat polymer emulsion for 3 h at 70° C. with mixing |
| Polymer 7b | 1.56 | 133.64 | Raise pH above 8 with 0.5% Na$_2$CO$_3$ and heat polymer emulsion for 3 h at 70° C. with mixing |

Example 8

First Pass Retention Test

The first pass retention test used a Britt CF Dynamic Drainage Jar having an upper chamber of about 1 liter capacity and a bottom drainage chamber, the chamber being separated by a support screen and a drainage screen. Below the drainage chamber was a downward extending flexible tube equipped with a clamp for closure. The upper chamber was provided with a variable speed, high torque motor equipped with a 2-inch 3-bladed propeller to create controlled shear conditions in the upper chamber. The test was conducted by placing a cellulosic slurry in the upper chamber and then subjecting the slurry to the following sequences:

| Sequence for Evaluating Polymer Performance | |
|---|---|
| Time (seconds) | Action |
| 0 | Commence shear stirring at 1250 rpm |
| 5 | Add starch and coagulant (when necessary) |
| 20 | Add polymer |
| 30 | Start draining |
| 60 | Stop draining; analyze filtrate |

The material drained from the Britt jar (the "filtrate") was collected and filtered through a glass fiber filter pad with a nominal pore diameter of one micron. The filter pad and filtrate were then dried at 105° C. for 12 hours and the dry mass of the filtrate was determined. The first pass retention value was calculated using the formula:

$$\text{First Pass Retention (\%)} = \left(\frac{\text{Cellulosic slurry consistency} - \text{Filtrate consistency}}{\text{Cellulosic slurry consistency}}\right) \times 100$$

Cellulosic slurry comprised solids which are made up of about 80 weight percent fiber and 20 weight percent filler, diluted to an overall consistency of 0.5 percent with formulation water. The fiber was a 60/40 blend by weight of bleached hardwood kraft (sulfate chemical pulp) and bleached softwood kraft (sulfate chemical pulp). To this slurry was added a mineral filler, namely a commercial calcium carbonate provided in dry form. The formulation water contained 60 ppm calcium hardness (added as $CaCl_2$), 18 ppm magnesium hardness (added as $MgSO_4$) and 134 ppm bicarbonate alkalinity (added as $NaHCO_3$). The pH of the final thin stock (cellulosic slurry plus filler and other additives equals a "stock") was between about 7.5 and about 8.0.

Figure 2:
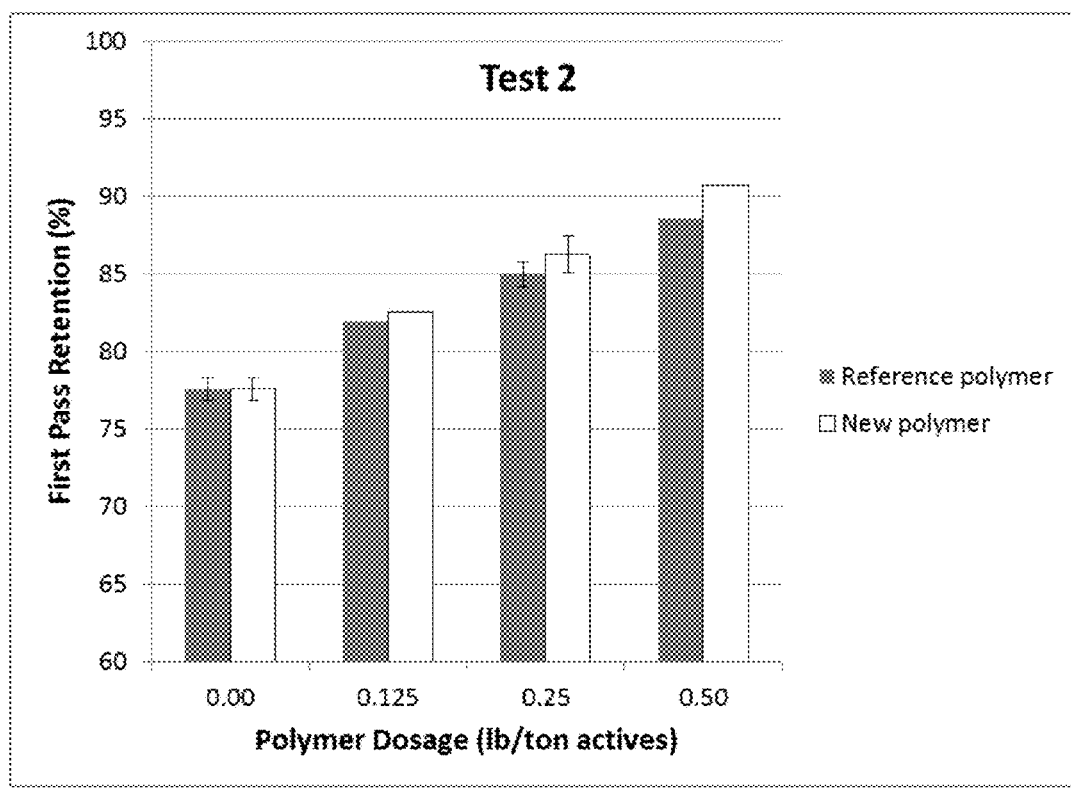
FIG. 2 is a graph of the results of a first pass retention test for various dosages of water-soluble polymers. Error bars represent the 90% confidence intervals.
Figure 3:
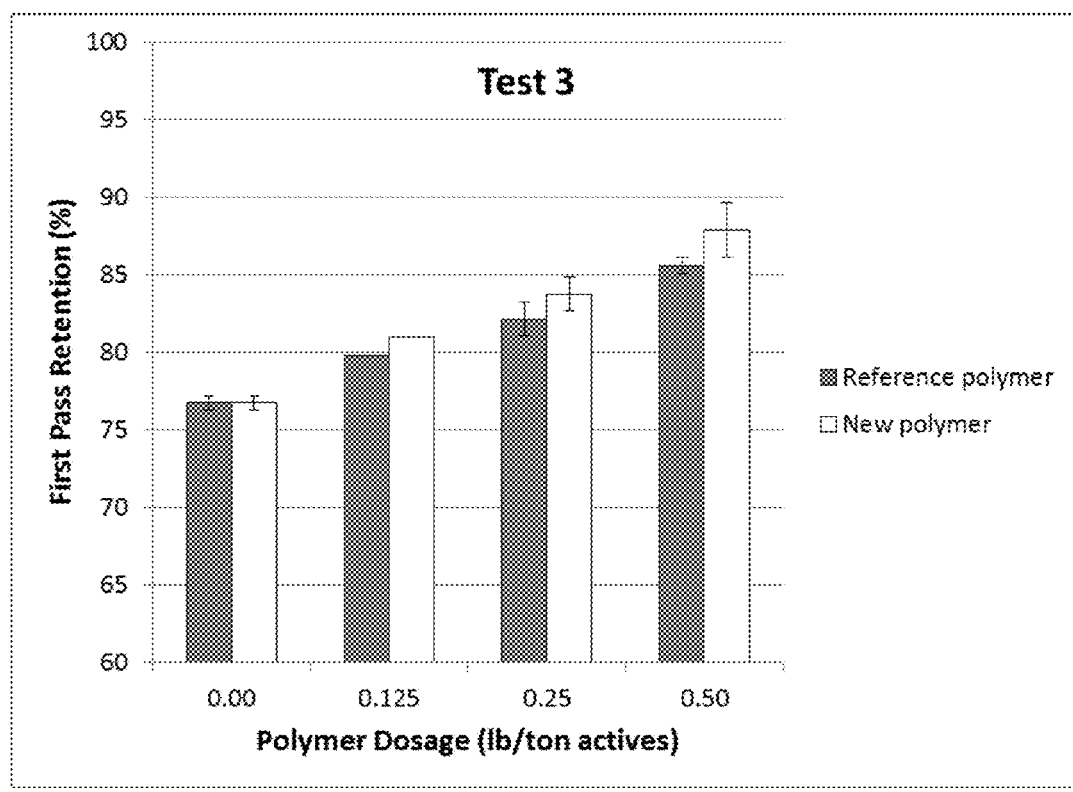
FIG. 3 is a graph of the results of a first pass retention test for various dosages of water-soluble polymers. Error bars represent the 90% confidence intervals.

Results are illustrated in Table 2 below, and graphically in FIGS. 1-3. The "New polymer" corresponds to polymer 7b as described in Example 7. The "Reference Polymer" is a high molecular weight 30 mol % anionic linear polymer with a RSV value between 38 dL/g and 49 dl/g. The polymer is an acrylamide/sodium acrylate copolymer to which no crosslinker was added.

Figure 4:
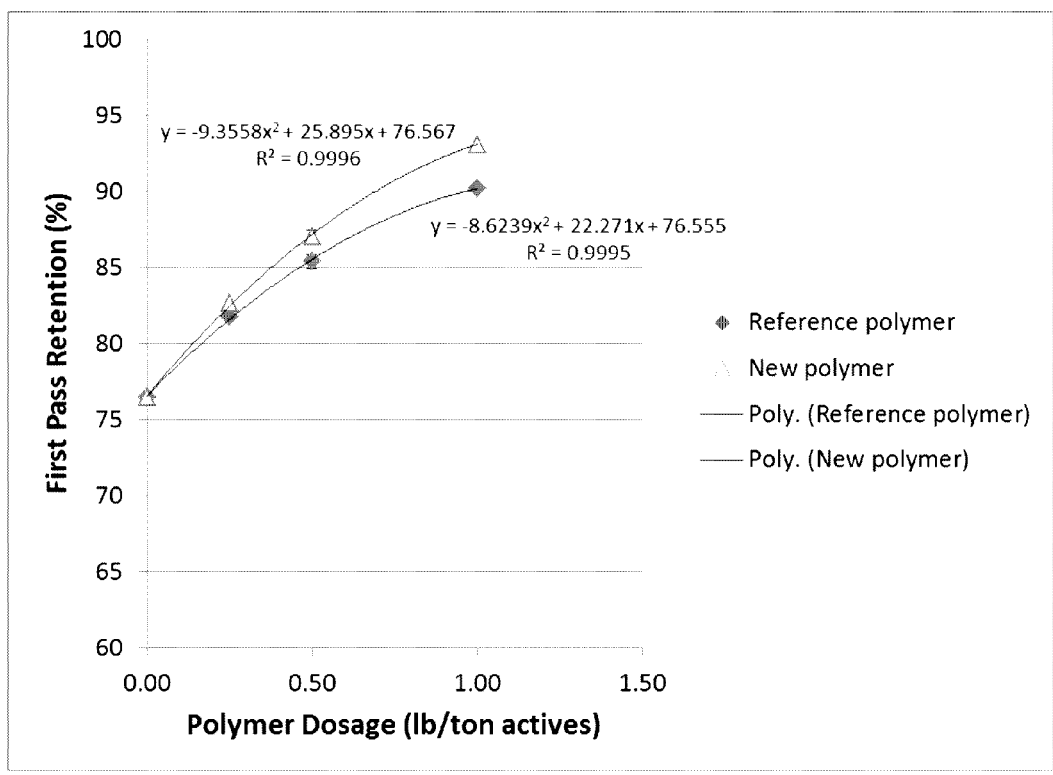
FIG. 4 is a graphical representation of the first pass retention % versus the polymer dosage.

FIG. 4 is a graphical representation of the data used to calculate an average replacement ratio. This was performed by selecting a first pass retention value (such as 85%) then using data trend lines fit using polynomial curves to the data points the corresponding dosages for each polymer were calculated. The percentage reduction in dosage from using the new polymer relative to the reference polymer was then calculated. If this was done for first pass retention values of 80%, 85%, and 90% and the replacement ratios were averaged. The use of polymer 7b results in approximately a 23% reduction in dosage to get equal performance compared to the reference polymer.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

The invention claimed is:

1. A method of preparing an activated polymer composition comprising:
   initiating free radical polymerization in a first aqueous composition comprising water, acrylamide monomers, and hydrolyzable cross-linkers to form a second aqueous composition comprising water and a water-soluble polymer having hydrolyzable cross-linked monomer units; and
   hydrolyzing the hydrolyzable cross-linked monomer units of the water-soluble polymer of the second aqueous composition by at least one of heating the second aqueous composition, changing the pH of the second aqueous composition, and changing the ionic strength of the second aqueous composition, to form the activated polymer composition.

2. The method of claim 1, wherein the hydrolyzable cross-linked monomer units are ionically cross-linked via an ionic interaction between two monomer units.

3. The method of claim 2, wherein the water-soluble polymer comprises from about 1 mol % to about 25 mol % ionically cross-linked monomer units.

4. The method of claim 2, wherein the water-soluble polymer comprises at least one monomer unit having the following formula (I):

TABLE 2

First Pass Retention Results Using Britt Jar Apparatus in Nalco Standard Alkaline Furnish with Increased Precipitated Calcium Carbonate Content

| Polymer Dosage (lb/ton furnish solids) | Reference Polymer | | | New Polymer | | |
|---|---|---|---|---|---|---|
| | Test 1 | Test 2 | Test 3 | Test 1 | Test 2 | Test 3 |
| 0.125 | x | 81.97 | 79.77 | x | 82.57 | 80.98 |
| 0.25 | 81.75 | 84.97 (±0.83) | 82.16 (±1.09) | 82.65 | 86.29 (±1.20) | 83.77 (±1.11) |
| 0.5 | 85.41 (±0.48) | 88.54 | 85.58 (±0.53) | 87.03 (±0.47) | 90.70 | 87.87 (±1.76) |
| 1 | 90.22 | x | x | 93.13 | x | x |

Values in ( ) represent the 90% confidence intervals for the data collected

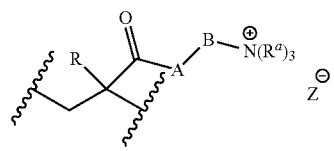

(I)

wherein:
R is selected from the group consisting of —H, $C_1$-$C_{24}$ alkyl, $C_2$-$C_{24}$ alkenyl and $C_2$-$C_{24}$ alkynyl; each $R^a$ is independently selected from the group consisting of —H, optionally substituted $C_1$-$C_{50}$ alkyl, optionally substituted $C_2$-$C_{50}$ alkenyl, optionally substituted $C_2$-$C_{50}$ alkynyl and optionally substituted aryl;

A is selected from the group consisting of O, S and $NR^b$;

$R^b$ is selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

B is selected from the group consisting of optionally substituted $C_1$-$C_{24}$ alkylenyl, optionally substituted $C_2$-$C_{24}$ alkenylenyl, optionally substituted $C_2$-$C_{24}$ alkynylenyl and optionally substituted $C_2$-$C_{24}$ heteroalkylenyl;

$Z^\ominus$ is an anion; and each ~~~ represents a point of attachment to the polymer backbone.

5. The method of claim 4, wherein the monomer unit of formula (I) is derived from a monomer selected from the group consisting of N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, and N,N-dimethylaminopropyl methacrylamide methyl chloride quaternary salt.

6. The method of claim 4, wherein the water-soluble polymer further comprises at least one anionic monomer unit derived from a monomer selected from the group consisting of an acrylic acid salt, a methacrylic acid salt, a 2-acrylamido-2-methylpropane sulfonic acid salt and a styrene sulfonic acid salt.

7. The method of claim 1, wherein the hydrolyzable cross-linked monomer units are covalently cross-linked.

8. The method of claim 7, wherein the covalently cross-linked monomer units have the following formula (II):

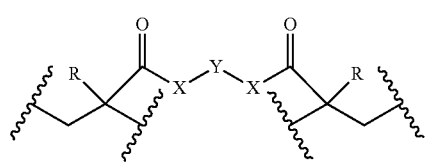

(II)

wherein:
each X is selected from the group consisting of O, S and $NR^b$;
each $R^b$ is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;
each R is independently selected from the group consisting of —H, optionally substituted $C_1$-$C_{24}$ alkyl, optionally substituted $C_2$-$C_{24}$ alkenyl and optionally substituted $C_2$-$C_{24}$ alkynyl;

Y is selected from a group consisting of a $C_1$-$C_{30}$ alkylenyl group, an oxalate group, a carbonate group, an ethylene glycol moiety, a propylene glycol moiety, and combinations thereof; and each ~~~ represents a point of attachment to a first polymer backbone, and each ᴡᴡ represents a point of attachment to the first polymer backbone or to a second polymer backbone.

9. The method of claim 7, wherein the covalently cross-linked monomer units have the following formula (IIa):

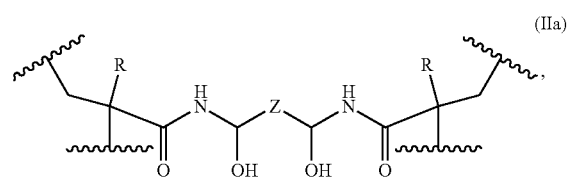

(IIa)

wherein:
each R is independently selected from the group consisting of —H and —$CH_3$;
Z is a $C_1$-$C_{12}$ alkylenyl group; and
each ~~~ represents a point of attachment to a first polymer backbone, and each ᴡᴡ represents a point of attachment to the first polymer backbone or to a second polymer backbone.

10. The method of claim 7, wherein the covalently cross-linked monomer units have the following formula (IIb):

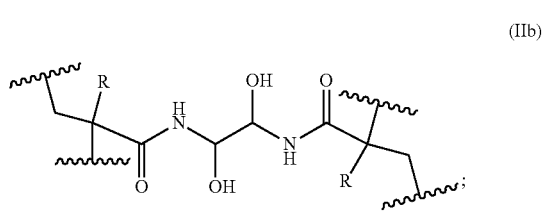

(IIb)

wherein:
each R is independently selected from the group consisting of —H and —$CH_3$; and
each ~~~ represents a point of attachment to a first polymer backbone, and each ᴡᴡ represents a point of attachment to the first polymer backbone or to a second polymer backbone.

11. The method of claim 1, comprising adding the activated polymer composition to at least one of a pulp slurry and a wet end of a papermaking machine.

12. The method of claim 11, wherein the activated polymer composition further comprises an additional retention aid, a filler, an optical brightening agent, a dye, a sizing agent, cationic starch, a fixative, a detackifier, a dispersant, a wet or dry strength additive, or any combination thereof.

13. The method of claim 1, wherein the activated polymer composition has a viscosity of about 60 cPs to about 150 cPs.

14. The method of claim 7, wherein the covalently cross-linked monomer units have at least one of the following formulae:

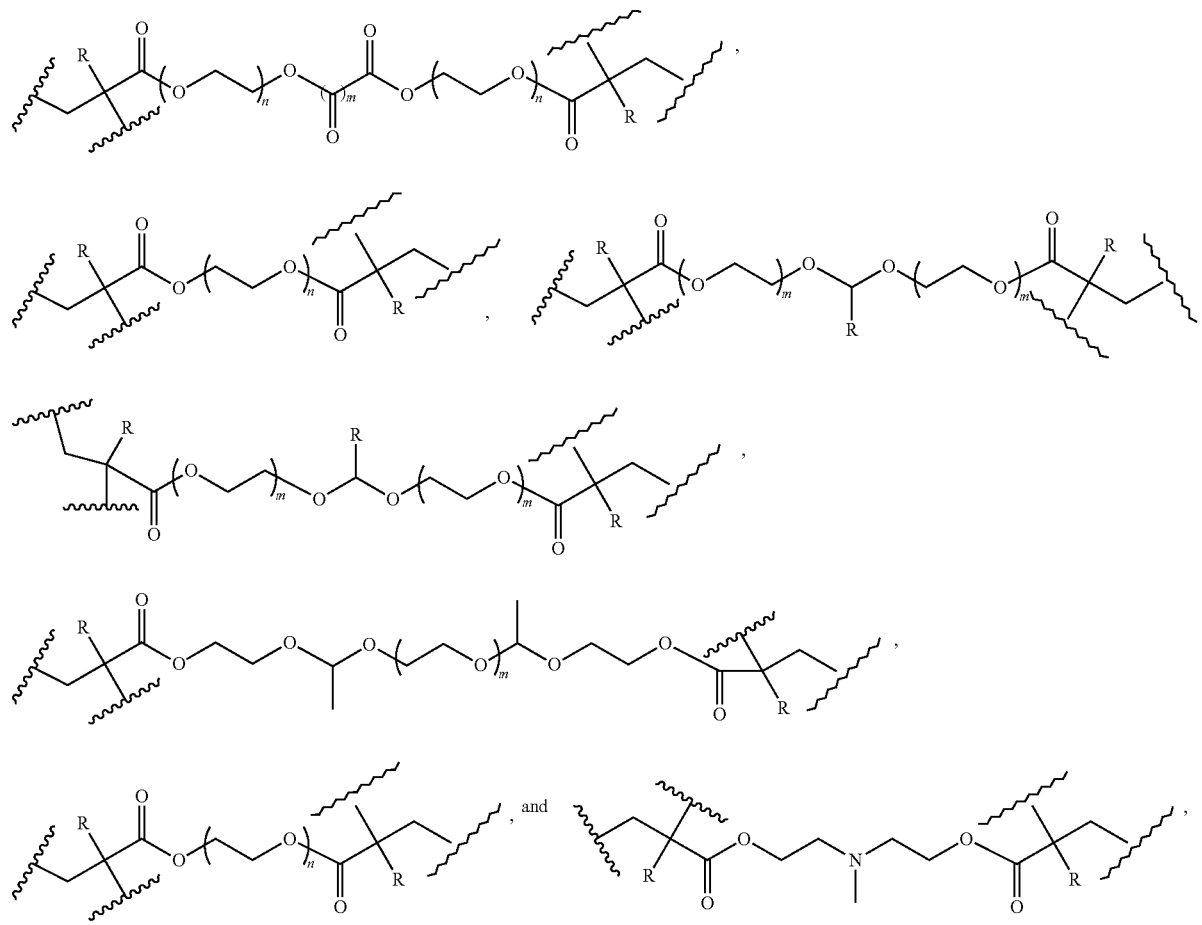

wherein each m is 1, 2, 3, 4, 5, 6, 7, 8, 9, 10, 11 or 12; each n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30; each R is independently selected from the group consisting of —H and —CH$_3$; and each R$^1$ is independently selected from the group consisting of —H and C$_1$-C$_{12}$ alkyl; each ⌇ represents a point of attachment to a first polymer backbone; and each ⌇⌇ represents a point of attachment to the first polymer backbone or to a second polymer backbone.

15. The method of claim 7, wherein the covalently cross-linked monomer units have at least one of the following formulae:

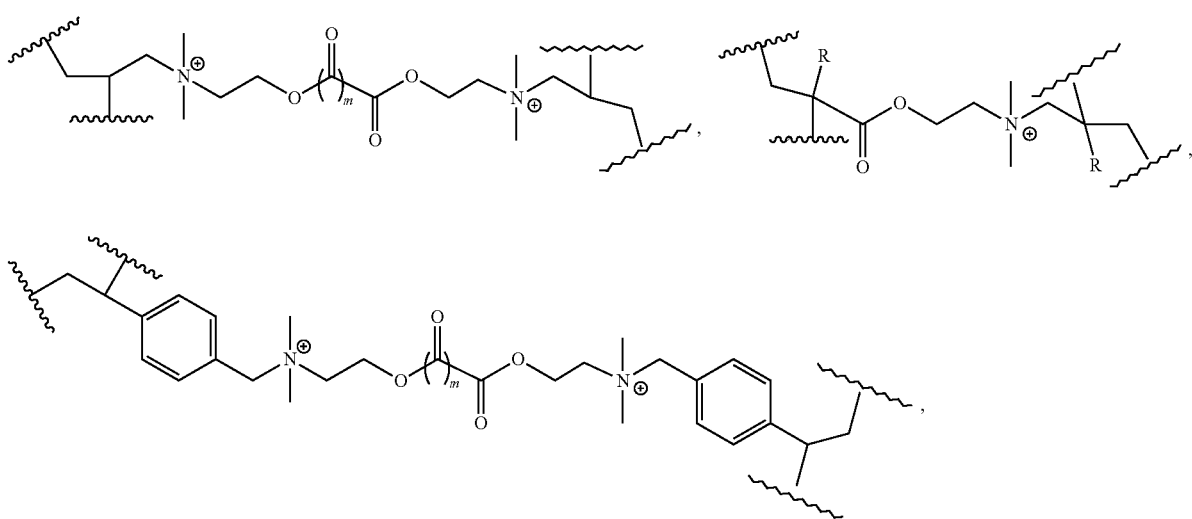

-continued

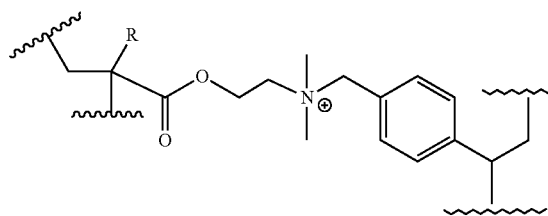 and 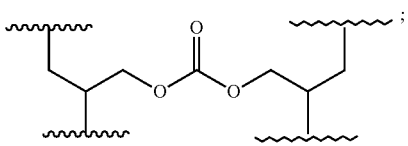

wherein:
each m is 1, 2, 3, 4, 5, 6, 7, 8, 9, 10, 11 or 12;
each R is independently selected from the group consisting of —H and —CH$_3$; and
each ∼∼ represents a point of attachment to a first polymer backbone, and each ∿∿ represents a point of attachment to the first polymer backbone or to a second polymer backbone.

16. The method of claim 7, wherein the covalently cross-linked monomer units have at least one of the following formulae:

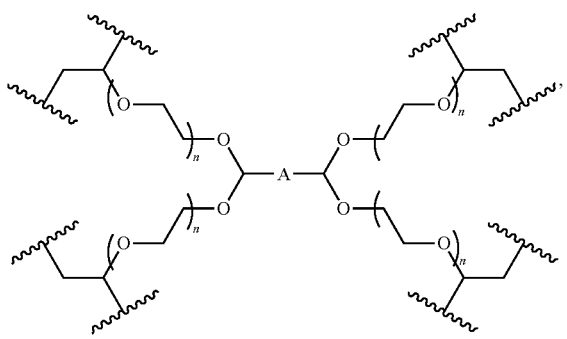

wherein A is selected from
O, S and NR$^b$;

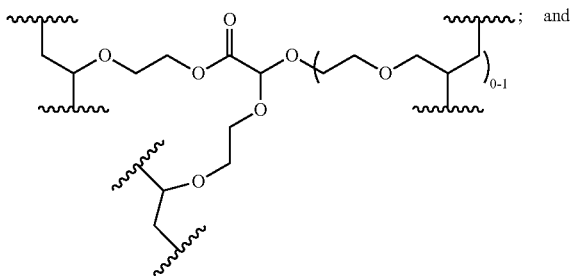

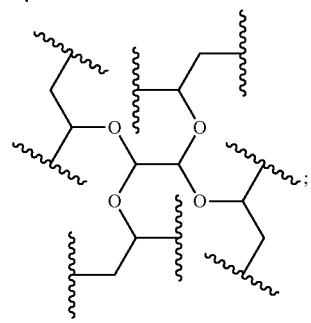

wherein:
each n is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30;
R$^b$ is independently selected from the group consisting of —H and —CH$_3$; and
each ∼∼ represents a point of attachment to a first polymer backbone, and each ∿∿ represents a point of attachment to the first polymer backbone or to a second polymer backbone.

17. The method of claim 1, wherein the water-soluble polymer of the activated polymer composition has a molecular weight of from about 500 kDa to about 50,000 kDa.

18. A method of preparing an activated polymer composition comprising:
initiating free radical polymerization in a first aqueous composition comprising water, acrylamide monomers, and glyoxal bis(acrylamide), to form a second aqueous composition comprising water and a water-soluble polymer having hydrolyzable cross-linked monomer units; and
hydrolyzing the hydrolyzable cross-linked monomer units of the water-soluble polymer of the second aqueous composition by at least one of heating the second aqueous composition, changing the pH of the second aqueous composition, and changing the ionic strength of the second aqueous composition, to form the activated polymer composition.

19. The method of claim 18, wherein the hydrolyzable cross-linked monomer units are covalently cross-linked.

20. The method of claim 19, wherein the covalently cross-linked monomer units have the following formula (IIb):

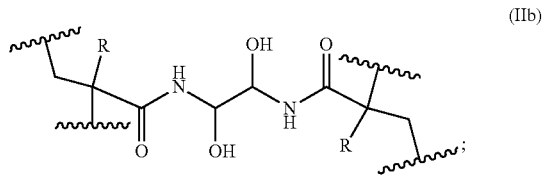

(IIb)

wherein:
each R is —H; and
each ∼∼ represents a point of attachment to a first polymer backbone, and each ∿∿ represents a point of attachment to the first polymer backbone or to a second polymer backbone.

21. The method of claim 18, wherein the aqueous composition further comprises monomer units selected from the group consisting of: acrylic acid or a salt thereof; methacrylic acid or a salt thereof; 2-acrylamido-2-methylpropane sulfonic acid or a salt thereof; acrolein; styrene sulfonic acid or a salt thereof; N-vinyl formamide; N-vinyl pyrrolidone; N,N-dimethylaminoethyl acrylate or a quaternized salt thereof; N,N-dimethylaminoethyl methacrylate or a quaternized salt thereof; N,N-dimethylaminopropyl acrylamide or a quaternized salt thereof; N,N-dimethylaminopropyl methacrylamide or a quaternized salt thereof; N,N-dimethyldiallylammonium chloride; and N,N-diallylamine.

22. The method of claim 18, wherein the water-soluble polymer of the activated polymer composition has a molecular weight of from about 500 kDa to about 50,000 kDa.

\* \* \* \* \*